J. JACKSON Jr.
Impt. in Corn Planter.
No. 118134
Patented Aug 15 1871
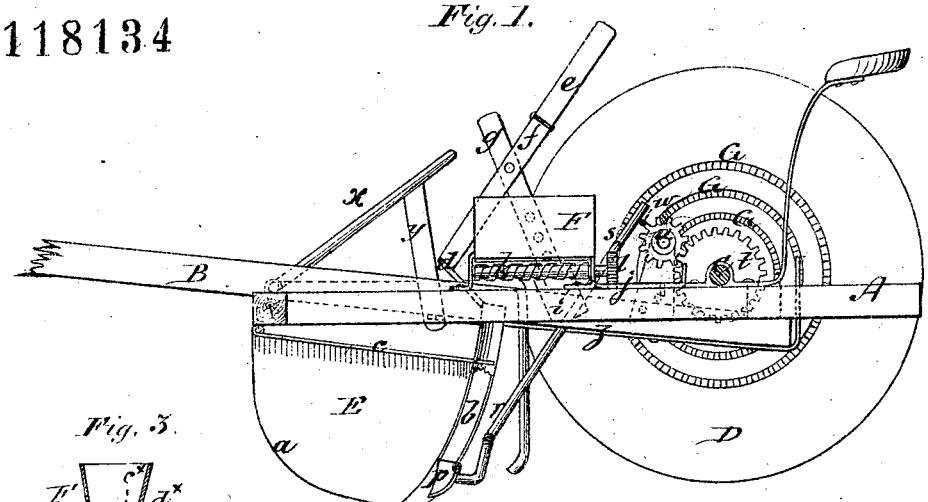
Fig. 1.
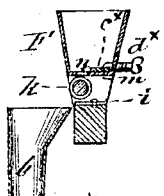
Fig. 3.
Fig. 4.
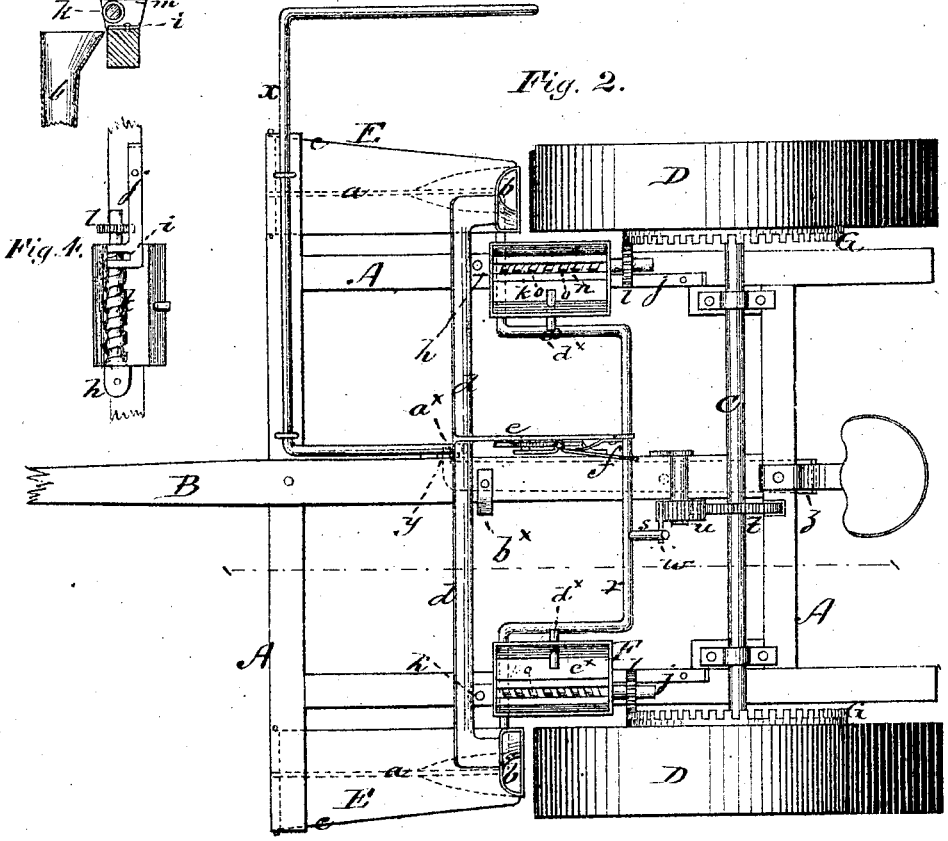
Fig. 2.
Witnesses:
T. C. Brecht
Phil. T. Dodge
Inventor:
John Jackson Jr.
by Dodge & Munn
Attys.

118,134

UNITED STATES PATENT OFFICE

JOHN JACKSON, JR., OF CHATSWORTH, ILLINOIS.

IMPROVEMENT IN CORN-PLANTERS.

Specification forming part of Letters Patent No. 118,134, dated August 15, 1871.

*To all whom it may concern:*

Be it known that I, JOHN JACKSON, Jr., of Chatsworth, in the county of Livingston and State of Illinois, have invented certain Improvements in Corn-Planters, of which the following is a specification, reference being had to the accompanying drawing.

My invention relates to certain improvements in the construction of double-row corn-planters, as hereinafter described.

Figure 1 is a longitudinal section of my machine taken on the line $xx$ of Fig. 2. Fig. 2 is a top-plan view of the machine. Figs. 3 and 4 are, respectively, a cross-section and a bottom-plan view of the corn-hopper and feeding devices.

In building my machine I first make a strong rectangular frame, A, having a rigid tongue, B, and suspend the rear end of the frame against the under side of a transverse shaft, C, which is mounted in two large wheels, D, located outside of the frame, as shown in Figs. 1 and 2. The front bar of this frame I extend out on each side, as shown in Fig. 2, and to each of these projecting ends I hinge the front end of a shoe or runner, E, which latter is thus located in front of the respective wheels D. These runners each consist of a vertical metal plate, $a$, rounded at its lower front end, an upright tube or drill-tooth, $b$, having its lower end curved forward, which is secured to the rear end of plate $a$, and a horizontal plate, $c$, secured on top to hold the plate $a$ and tube $b$ together and form a means of attaching the hinge.

As the machine is drawn forward the curved end of the tube $b$ draws the runner into the ground so as to open the furrow. This is a very great improvement over all runners heretofore in use, which, owing to their form, required the application of considerable pressure or weight to cause them to enter the ground. This weight was obtained either by placing the corn-hoppers upon the runners or by applying and carrying an extra dead-weight for the purpose, both of which plans were very objectionable.

The two runners I connect by a cross-bar, $d$, provided at its middle with a rigid hand-lever, $e$, so that by raising the said lever the runners may be lifted out of the ground. To the side of the hand-lever $e$ I pivot a catch or lever, $f$, and on the tongue I mount a curved bar, $g$, provided with a series of holes, into any one of which the catch $f$ may be engaged. In this manner the hand-lever may be fastened in any desired position, so as to hold the runners either out of or into the ground, as may be necessary. On each side of the main frame I place a corn-hopper, F, having an ear, $h$, at its front end, and secure the hopper in place by a pivot or bolt through the ear, so that the back end of the hopper may be moved laterally for the purpose of throwing the feeding devices in and out of gear, as hereinafter described. To the bottom of the hopper, at its rear end, I secure a slotted plate, $i$, through which a headed bolt is passed into the frame, so as to prevent the end of the hopper from rising. I also attach to the rear end of the hopper a horizontal spring-arm, $j$, which may be engaged with a pin or other device on the frame so as to hold the hopper in the desired position and prevent it from moving laterally at improper times. Under the bottom of each hopper I mount lengthwise thereof a horizontal worm or screw, $k$, so as to turn freely. The rear journal of the screw I extend through and a considerable distance beyond the back end of the hopper, and mount upon it a cog-pinion, $l$, which may be moved laterally thereon. On the inner side of each of the main wheels D I secure three or more crown-wheels, G, of different sizes, as shown in Fig. 1. By adjusting the pinion $l$ to the proper point on the journal and then swinging the rear end of the hopper outward the pinion may be thrown in gear with either one of the wheels G. When the pinion is thus thrown in gear and the machine started, the wheels G, being turned, will set the worm or screw in motion. By adjusting the pinion so as to gear into one or the other of the wheels G the speed of the screw may be regulated as desired. The pinion is thrown out of gear and the screw stopped by lifting the end of arm $j$ off from its pin or stop and swinging it inward, which moves the rear end of the hopper and the pinion away from the wheel G. The thread or groove in the screw I make of a width equal to the length of a kernel of corn and of a depth a little less than the thickness of a kernel, and across the hopper, closely above the screw, I place a horizontal bottom, $m$, having a longitudinal slot, $n$, in it, as shown in Figs. 2 and 3. This slot is immediately above the screw and is of a width equal to the length of a kernel of corn. It will thus be seen that the screw, with the slotted bottom above it, forms a series of pockets or cells, o, as shown in Figs. 2 and 3, each of the proper size to contain a single kernel of corn. As the depth of the thread is less than the thickness of a kernel, it follows that, when a kernel falls through the slot into the thread or groove of the screw, it will project above the face of the latter and bear against the walls of slot n so that it cannot fall or roll off to either side, so that as the screw revolves it moves the kernel along in the slot toward the front end of the hopper. As each thread of the screw forms a cell or pocket where it passes under the slot, it follows that there will be several kernels in motion at the same time behind one another. The slot n I extend out through the front end of the hopper, so that the kernels will be fed out when they reach the front end of the screw, there being, of course, one kernel shoved out at each revolution of the screw. The thread of the screw is cut in such direction that the latter must revolve outward to feed the corn forward, so that when the corn reaches the end of the screw and is discharged therefrom it is thrown or rolled over outside of the frame into the upper end of the seed-tube b. The upper end of this tube I make flaring, as shown in Figs. 2 and 3, so as to come close to the side of the screw and thereby prevent any liability of the corn to fall outside of the tube.

As the machine proceeds it will be seen that the runners will each open a furrow, and that at regular intervals each screw will discharge a kernel of corn through the tube into the furrow, and that the wheels D following behind will cover the corn with earth. By adjusting the pinion so as to change the speed of the screw the kernels may be dropped with greater or lesser frequency, and, consequently, at any required distance apart. The greater the speed of the screw the oftener will the corn be dropped, and, consequently, the closer together will the kernels be planted, while the slower the speed the longer the intervals between the dropping and the greater the distance between the kernels.

The machine thus arranged acts as a corn-drill for planting two rows with the kernels at regular distances apart, the distance being more or less, as required. But as the machine is sometimes required to drop the corn in hills, with several kernels in each, I attach to the lower end of each tube b a hinged valve, p, for closing the same, so that a number of kernels may be collected in the tube, and then all of them discharged at once by opening said valve. The two valves p I connect by a bent rod, r, extending up over the tongue, and provided at its middle with an arm, s. On the middle of the main axle C I secure a cog-wheel, t, and on the tongue in front of the cog-wheel I mount a pinion, u, which may be moved laterally, and thereby be thrown in and out of gear with said wheel t. The pinion I provide on one side with an arm or pin, w, which at each revolution of the pinion raises the arm s, and thereby opens the valves p and discharges the accumulated corn.

The wheel t and pinion u are, of course, so proportioned as to open the valves at such intervals as to bring the hills at the required distance apart. The number of kernels deposited in a hill is regulated by adjusting the pinion of the feed-screw, as the faster the screw runs the greater will be the number of kernels deposited in the tube while the valve is closed. As the feeding and the dropping devices are both automatic in their operation and independent of each other, any desired number of kernels may be dropped, and, owing to the peculiar construction of the feeding mechanism, the number of kernels fed into the tube may be regulated with perfect certainty.

On the front of the main frame I mount a transverse rock-shaft, $x$, the end of which projects out on the right-hand side of the machine and is bent backward and downward so as to drag upon the ground and serve as a marker. By turning this shaft on its axis its outer end may be raised off from the ground. The inner end of this shaft I bend at a right angle, and provide it with a depending arm, $y$, having a hole through its lower end, as shown in Figs. 1 and 2. To the under side of the tongue I pivot a lever, $z$, having a stud, $a^\times$, on its front end, which may be engaged in the hole in arm $y$ so as to hold the latter up, and thereby keep the outer end of the marker-shaft up from the ground. By moving the back end of lever $z$ with his foot the operator may release arm $y$ and let the marker fall. A spring, $b^\times$, is applied behind the lever $z$, so that when the arm is raised the stud of the lever will engage automatically.

When the machine is being used as a drill for planting single kernels at equal distances apart the lever is held or fastened up so as to keep the valves $p$ open.

To provide for feeding corn of different sizes I mount in the bottom of each hopper a sliding plate, $c^\times$, moved by a thumb-screw, $d^\times$, by which the width of slot $n$ may be varied, as necessary.

I am aware that seeding-machines have been made in which the seed passed from the hopper down into a spout or channel underneath, having a screw located therein for feeding it out, and therefore I do not claim such; but Having described my invention, what I claim is—

1. The screw $k$, arranged underneath the hopper, with an opening in the hopper bottom extending to its front, and of such a width as to permit the kernels to move singly along said opening or slot, substantially as described.

2. The hoppers F, pivoted at their front end and arranged to swing inward for the purpose of throwing the driving mechanism in and out of gear, substantially as set forth.

3. The combination of the screw $k$ and the adjustable pinion $l$ with the series of driving-cog-wheels G for regulating the feed, as set forth.

4. The hinged runners E, having the inclined tubes $b$ attached to their rear ends, and all arranged to operate as set forth.

5. The tubes $b$, provided with the valves $p$ having the rod $r$ attached thereto, in combination with the movable pinion $u$ provided with the pin or arm $w$ and the driving-wheel $t$, all arranged to operate as set forth.

6. The runners E, hinged at their front end to the frame and having their rear ends connected by the cross-rod $d$, provided with the arm $f$, in combination with the standard $g$, arranged as described, whereby the runners can be raised and suspended independently of the hoppers, as set forth.

7. The marker $x$, having the arm $y$ attached, with the pivoted lever $z$, arranged and operating as herein set forth.

JOHN JACKSON, Jr.

Witnesses:
J. A. MAHANNAH,
JOHN G. TRUE.